United States Patent

[11] 3,580,542

[72] Inventor Allen C. Wright
Moraga, Calif.
[21] Appl. No. 855,599
[22] Filed Sept. 5, 1969
[45] Patented May 25, 1971
[73] Assignee Haws Drinking Faucet Company
Berkeley, Calif.

[54] PUSHBUTTON VALVE
10 Claims, 4 Drawing Figs.
[52] U.S. Cl. ................................................. 251/282, 251/175
[51] Int. Cl. .................................................. F16k 1/10
[50] Field of Search ..................................... 251/171, 172, 175, 176, 282

[56] References Cited
UNITED STATES PATENTS

| | | | |
|---|---|---|---|
| 1,596,049 | 8/1926 | Kienast | 251/175 |
| 2,560,841 | 7/1951 | Bishop | 251/175X |
| 3,329,168 | 7/1967 | Vollmer | 251/175X |
| 3,432,141 | 3/1969 | Irti | 251/282X |

*Primary Examiner*—Harold W. Weakley
*Attorney*—Joseph B. Gardner

ABSTRACT: A pushbutton valve of the type used in drinking fountains to control the flow of water to the discharge nozzle thereof. The moveable control component of the valve assembly is isolated from unbalanced pressure forces and is therefore displaceable between the open and closed positions thereof with substantially the same manual force irrespective of the pressure of the water supply delivered to the fountain. The valve assembly includes a casing defining a cylinder having inlet and outlet passages and communicating therewith intermediate its ends and at laterally spaced locations. A control piston reciprocable within the cylinder is moveable between open and closed positions and is spring biased toward the closed position thereof. The piston has a valve chamber intermediate its ends within which is located a valve structure providing a pressurizable chamber and inlet and outlet ports opening thereinto and communicable with the inlet and outlet passages of the assembly when the control piston is in its open position. The valve structure is comprised of a plurality of individual components, and water pressure within the pressurizable chamber biases the valve components into slidably sealing engagement with the walls of the cylinder.

Patented May 25, 1971 3,580,542
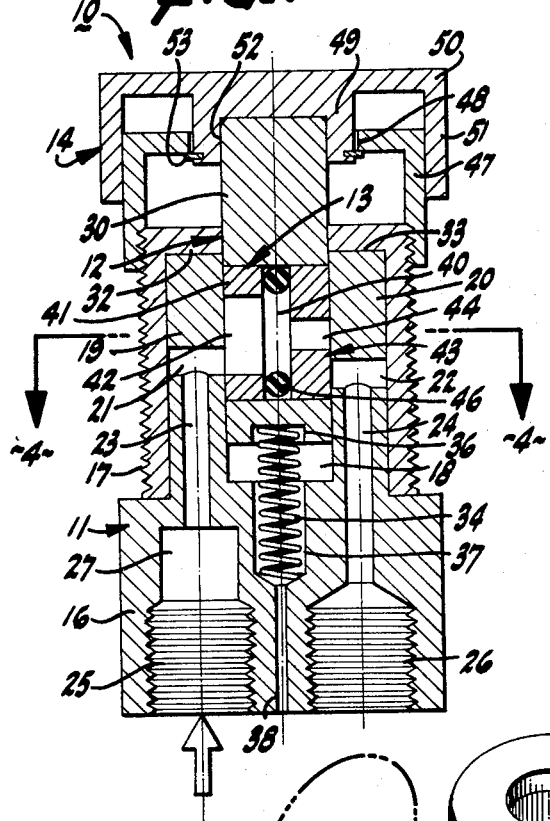
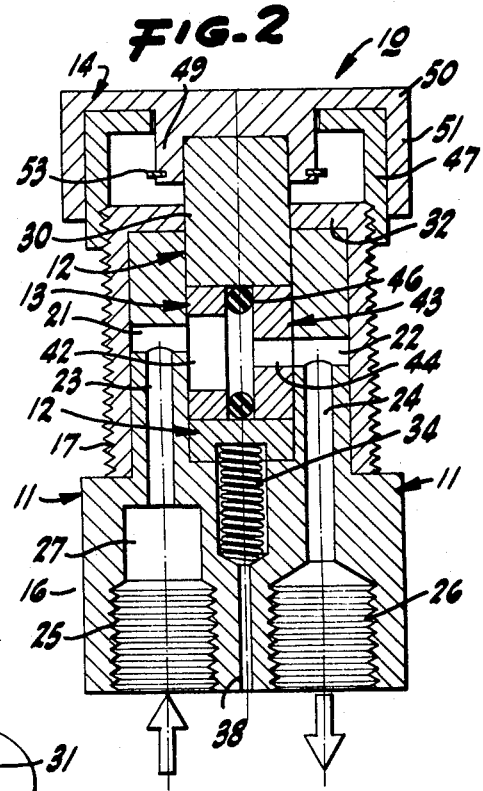
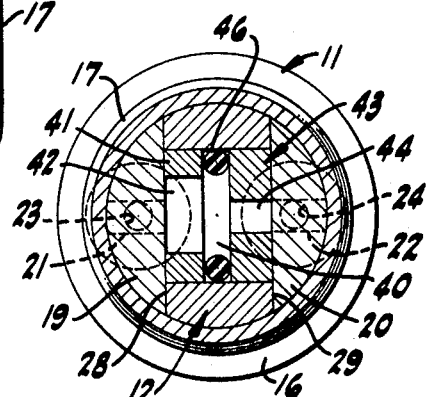
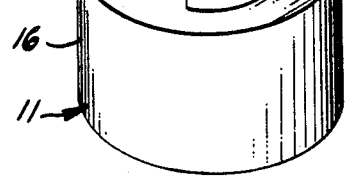
INVENTOR
ALLEN C. WRIGHT
BY Joseph B. Gardner
ATTORNEY

PUSHBUTTON VALVE

This invention relates to a valve assembly for controlling liquid flow and, more particularly, to a pushbutton valve assembly especially useful in controlling the flow of water to the discharge nozzle of a drinking fountain or the like.

Conventional pushbutton valves used to control the flow of water to the discharge nozzle of a drinking fountain are often difficult to operate, especially for small children, because the amount of force required to displace the valve from its normally closed position into the open position thereof depends upon the pressure of the water being supplied to the fountain. Supply pressure varies considerably from community to community and, for example, in some areas the supply line pressure may be of the order of 20 p.s.i.g. while in other locations it may be of the order to 100 p.s.i.g. Accordingly, if the moveable component of the valve must operate against the supply line pressure, the magnitude of the force necessary to open the valve will be significantly greater in locals where the supply line pressure is high than in those communities in which the supply line pressure is quite low. Also, in any one locality the supply line pressure may vary considerably throughout the day depending upon the overall demand being made upon the water system at any particular time.

An object, among others, of the present invention is to provide a improved valve assembly of the type used to control the flow of liquids and especially repetitively intermittent flows such as those characteristic of drinking fountains. Another object of the invention is in the provision of an improved pushbutton valve assembly or the like having a control element selectively movable between open and closed positions, and which control element is substantially isolated from the pressure force of the liquid being controlled by the valve assembly so that the force required to move the control element from closed to open position is essentially independent of the magnitude of the pressure of the liquid being delivered to the valve assembly.

Still another object is that of providing an improved valve assembly of the type described that utilizes the pressure of the liquid being supplied to the valve assembly to sealingly relate the movable control element thereof to the stationary components of the assembly, thereby automatically compensating for any wear to which the valve assembly is subjected. A further object of the invention is to provide a pushbutton valve assembly as described that is structurally simple, relatively inexpensive, positive in its operation, and that has a long life expectancy.

Additional objects and advantages of the invention, especially as concerns particular features and characteristics thereof, will become apparent as the specification develops.

In general terms, the valve assembly includes a valve casing defining an axially extending cylinder having inlet and outlet passages communicating therewith intermediate its ends and at laterally spaced locations. A control element in the form of a piston is reciprocable within the cylinder between open and closed positions and is resiliently biased toward the closed position thereof. The piston carries valve structure between such open and closed positions and for this purpose is provided with a relatively large valve chamber within which the valve structure is mounted. The valve structure has inlet and outlet ports respectively communicable with the inlet and outlet passages in the open position of the piston, and the valve structure provides a pressurizable chamber that may include the inlet and outlet ports as elements thereof. The valve structure is comprised of separable segments or components respectively associated with the inlet and outlet ports, and such components are spaced apart laterally and have a resilient seal disposed therebetween that sealing relates the same to the piston. The liquid pressure within the pressurizable chamber also serves to urge the valve components into slidably sealing engagement with the walls of the cylinder so as to inhibit leakage thereat.

An embodiment of the invention is illustrated in the accompanying drawing in which:

FIG. 1 is a longitudinal sectional view of the valve assembly showing the components thereof in their closed position;

FIG. 2 is a longitudinal sectional view similar to that of FIG. 1 but showing the components of the assembly in their open position;

FIG. 3 is an exploded perspective view of the valve assembly; and

FIG. 4 is a transverse sectional view taken along the line 4-4 of FIG. 1.

The valve assembly is denoted in its entirety with the numeral 10 and it includes a valve casing 11, control mechanism including a piston or spool 12 and valve structure 13, and pushbutton or actuating mechanism 14. The valve casing 11 is ordinarily supported upon a drinking fountain or the like so as to be rigidly related thereto, and the control mechanism comprising the piston 12 and valve structure 13 is selectively moveable relative to the casing 11 between the upper closed position shown in FIG. 1 and the lower open position illustrated in FIG. 2 upon suitable manual manipulation of the pushbutton mechanism 14. Any conventional means may be employed to fixedly secure the valve assembly 10 to such fountain, and since such arrangements are well known and do not pertain to the present invention, they are not shown and need not be further described.

Referring particularly to FIGS. 1 and 3, the valve casing 11 is seen to comprise two components one of which is the main body component 16 and the other of which is a cap 17 adapted to be mounted upon the upper end portion of the body 16. The body component 16 of the valve casing 11 is equipped with an axially extending cylinder 18 defined between a pair of transversely spaced and upwardly extending walls 19 and 20 respectively provided with inlet and outlet passages 21 and 22. As seen best in FIG. 1, the passages 21 and 22 are offset axially relative to each other such that the passage 21, which is the inlet passage, is somewhat higher than the outlet passage 22. The passages 21 and 22 respectively communicate with axially extending bores or passageways 23 and 24 which may be enlarged and threaded at their extremities as shown at 25 and 26 so as to enable inlet and outlet conduits (not shown) to be respectively secured thereto. The inlet passageway 25 may be enlarged intermediate its ends as shown at 27 so that a flow control device can be positioned therein to maintain a relatively uniform volumetric flow of liquid (usually drinking water) to the inlet passage 21 irrespective of the magnitude of the pressure of the liquid being delivered to the passageway 25.

The inner facing surfaces of the transversely spaced walls 19 and 20 are planar and parallel, and the piston 12 is receivable within the cylinder 18 and is axially reciprocable with respect thereto. Correspondingly, the control piston 12 has substantially parallel, generally planar sidewalls 28 and 29 that slideably engage the facing surfaces of the walls 19 and 20 as shown in FIGS. 1 and 2. The outer surfaces of the walls 19 and 20 are cylindrical segments and, as shown in both FIGS. 3 and 4, the end walls of the piston 12 are arcuate and together with the outer surfaces of the walls 19 and 20 define a cylindrical configuration that snuggly seats within the hollow cylindrical interior of the cap 17.

The piston 12 at its upper end is reduced in cross-sectional diameter to define an extension 30 that projects projects through an opening 31 provided therefore in the top wall 32 of the cap 17. The juncture of the main portion of the piston 12 with the upper reduced extension 30 thereof is defined along a transverse surface 33 defining a stop adapted to abut the underside of the top wall 32 of the cap 17 so as to limit upward displacement of the piston relative to the casing 11. It may be observed that the piston 12 is biased upwardly into the closed position thereof in which the shoulder 33 abuts the wall 32 of the cap 17 by a helical compression spring 34 that at its upper end seats within a recess 36 provided therefor in the undersurface of the piston 12 and at its lower end seats within an axially extending passage 37 formed within the casing 11 intermediate the walls 19 and 20 thereof. It may be noted that the lower end portion of the cylinder 18 below the piston 12 opens to atmosphere through a vent passage 38. The cap 17 may be secured in coaxial circumjacent relation with the walls 19 and 20 and piston 12 disposed therebetween by any suitable means such as a sweat or press fit.

The control piston 12 is provided intermediate the ends of the enlarged lower portion thereof with a valve chamber 39 that is cylindrical and oriented so that the axis thereof is transversely disposed and extends generally between the inlet and outlet passages 21 and 22. The aforementioned valve structure 13 is mounted within the valve chamber 39 and provides a pressurizable chamber 40 adapted to be continuously supplied with liquid under pressure from the inlet passage 21. More particularly as concerns the valve structure 13, it comprises an inlet segment of washerlike cylindrical configuration adapted to snuggly fit within the valve chamber 39, as shown in FIG. 1. The inlet segment 41 is provided with a large inlet port 42 therethrough of sufficient cross-sectional area so that it is in continuous communication with the inlet passage 21 irrespective of whether the valve is in the open or closed position thereof. The valve structure 13 further comprises an outlet segment 43 also of washerlike cylindrical configuration and adapted to fit snuggly within the valve chamber 39. The outlet segment 43 has an outlet port 44 therethrough of substantially smaller cross-sectional area than that of the inlet port 42 so as to fully communicate with the outlet passage 22 only when the valve structure is in the open position illustrated in FIG. 2, and partially communicate therewith as the valve structure moves between the open and closed positions thereof.

It will be observed that the outer faces of the valve segments 41 and 43 are planar surfaces respectively lying along the planar surfaces 28 and 29 of the piston 12 so as to slidingly engage the inner facing surfaces of the walls 19 and 20 of the valve casing 16. The segments 41 and 43 are relatively thin and are spaced apart transversely and receive a resilient seal 46 therebetween which is in the form of an O-ring. The O-ring 46 biases the valve segments 41 and 43 outwardly toward sealing engagement with the facing surfaces of the casing walls 19 and 20 as will be described in greater detail hereinafter. It will be appreciated that the aforementioned pressurizable chamber 40 is aggregated by the large inlet port 42 in the segment 41, the smaller outlet port 44 in the valve segment 43, and the space essentially defined within the O-ring 46 intermediate the segments 41 and 43.

The pushbutton mechanism 14 as respects the present invention may take any convenient form, and the typifying mechanism shown includes a mounting member 47 of generally cylindrical configuration that is internally threaded so as to receive and engage the external threads provided by the cap 17. The mounting member 47 has a large central opening 48 therethrough that telescopically receives a center depending boss 49 provided by a pushbutton 50 which is also of cylindrical configuration and has a depending skirt 51 that telescopically receives the member 47 therewithin. The boss 49 has a large central recess 52 receiving the reduced upper end portion or projection 30 of the piston 12, and a snapring 53 seated within an annular channel provided therefor in the boss 49 underlies the top wall of the mounting member 47 so as to prevent separation of the pushbutton 50 from the mounting member 47. Various arrangements may be used to unite the pushbutton mechanism 14 with the valve casing 11 and piston 12 other than the one illustrated such as the tamper-proof arrangement disclosed in my pending U.S. Pat. application Ser. No. 780,839, filed Dec. 3, 1968, and entitled Water Bubbler Assembly.

In use of the valve assembly 10, the casing 11 is secured to a drinking fountain or otherwise located at a position convenient for manual manipulation so as to control the flow of liquid to the discharge nozzle of such fountain. The inlet passageway or bore 23 is connected to a supply conduit such as the usual water supply line, and the outlet passageway or bore 24 is connected with a conduit leading to the discharge nozzle. Ordinarily the valve will be closed and therefore in the position shown in FIG. 1, and it will be noted that the pressurizable chamber 40 is continuously in communication with the inlet passage 21 so that it is filled at all times with the liquid under pressure being supplied to the valve assembly. The outlet pass 22 is closed however, since it is in facing relation with the planar outer surface of the valve segment 43.

To initiate the flow of liquid through the valve assembly, the pushbutton mechanism 14 is displaced downwardly and into the position shown in FIG. 2 in which case the outlet port 44 is aligned with the outlet passage 22, whereupon the liquid being supplied to the passageway 23 is delivered through the inlet passage 21 and pressurizable chamber 40 to the outlet passage 22 and passageway or bore 24 connected therewith. Whenever the pushbutton mechanism 14 is released, the biasing force of the spring 34 returns the piston 12 and valve structure 13 carried within the valve chamber 39 thereof to the closed position of the assembly shown in FIG. 1.

It will be observed that the piston 12 is axially displaceable between the closed and open positions thereof respectively shown in FIGS. 1 and 2 without operating against the pressure force of the liquid being supplied to the valve assembly. More particularly in this respect, it will be noted that the only substantial forces operating upwardly against the piston 12 tending to displace it toward the upper closed position of FIG. 1 are the biasing force of the spring 34 and the atmospheric air pressure entering the lower end portion of the cylinder 18 via the vent 38. Substantially the only forces acting downwardly upon the piston 12 are the gravitational force owing to the weight of the piston and valve structure 13 carried thereby and weight of the pushbutton 50 which seats upon the upper end portion 30 of the piston 12, and the atmospheric air pressure operative upon the upper surface of the pushbutton 50.

Therefore, it is only necessary to manually apply a down push or downwardly directed force upon the pushbutton 50 of sufficient magnitude to overcome the biasing force of the spring 34 and the frictional inhibition to movement of the piston 12 in order to displace the piston into its open position shown in FIG. 2 (the upwardly directed force attributable to the air pressure within the lower end portion of the cylinder 18 is more than counterbalanced by the superior valve of the force attributable to the air pressure acting downwardly upon the upper surface of the pushbutton 50 which has a much greater surface area than that of the piston 12). Accordingly, substantially irrespective of the magnitude of the pressure of the liquid being supplied to the valve assembly, the same degree of manual force is required to operate the valve or, more particularly, to displace the piston downwardly from the closed position shown in FIG. 1 into the open position shown in FIG. 2.

It should also be observed that the pressure of the liquid being supplied to the valve assembly is utilized in preventing leakage in and about the piston 12. That is to say, since the pressurizable chamber 40 is continuously in open communication with the inlet passage 21 and supply passage 23, a pressure force continually operates against the inner surfaces of the seal 46 tending to urge it radially outwardly into tight sealing engagement with the circumjacent surface defined by the valve chamber 39. This same pressure force active against the seal 46 causes it to spread laterally or transversely as it is pressed against the surrounding wall of the valve chamber 39, thereby urging the seal into tight sealing engagement with the contiguous surfaces of the valve components 41 and 43 to effect a liquidtight seal therewith. Accordingly, substantially no leakage from the pressurizable chamber 40 can occur about the seal 46.

At the same time, the liquid pressure within the chamber 40 also acts directly against exposed inner surfaces of the valve components 41 and 43 thereby tending to displace the same laterally and into tight sealing engagement with the facing contiguous surfaces of the casing walls 19 and 20 so that substantially no leakage occurs therebetween. Thus, the valve components 41 and 43 are biased outwardly both by the resilient force of the seal 46 occasioned by compression thereof as a consequence of the fluid pressure acting radially outwardly thereagainst and by the pressure force acting directly against the exposed, noncounterbalanced, pressurizable surfaces of the components 41 and 43.

Utilizing the magnitude of the pressure force to effect sealing engagement of the valve components 41 and 43 with the casing walls 19 and 20 is advantageous in that it permits the valve assembly to automatically accommodate the requirement for increased sealing as supply pressures increase and to similarly accommodate any wear that occurs along the slidably related surfaces of the valve components and cylinder walls. In this reference, as the slidably engaged surfaces wear, the pressure force simply displaces the components 41 and 43 outwardly to a greater extent to maintain the slidably sealing engagement of the valve components with the walls 19 and 20. As respects wear, the valve components 41 and 43 are advantageously formed of a material having a relatively low coefficient of friction as, for example, a self lubricating material such as teflon. The other components and elements of the valve assembly may be made from any suitable material and usually a material having a high degree of resistance to corrosion will be used. Thus, the casing 11 may be formed of brass and the piston 12 may best be constituted of a synthetic plastic material as, for example, nylon.

While in the foregoing specification an embodiment of the invention has been described in considerable detail for purposes of making a complete disclosure thereof, it will be apparent to those skilled in the art that numerous changes may be made in such details without departing from the spirit and principles of the invention.

I claim:

1. A pushbutton valve assembly for a drinking fountain or the like, comprising a valve casing defining an axially extending cylinder and being provided with inlet and outlet passages communicating with said cylinder at laterally spaced locations intermediate the ends thereof, a piston reciprocable within said cylinder between open and closed positions and being provided with a valve chamber oriented so as to extend generally between said passages, valve structure carried by said piston within said valve chamber and providing a pressurizable chamber having inlet and outlet ports respectively communicable with said inlet and outlet passages in the open position of said piston so as to establish flow connection between said passages, and means biasing said piston toward the closed position thereof, the only appreciable fluid pressure in active application to said piston being substantially confined within said pressurizable chamber with the result that there are no significant pressure forces operative between said piston and casing tending either to implement or inhibit axial displacements of said piston.

2. The valve assembly of claim 1 in which said valve structure comprises a plurality of individual components one of which is an inlet component and the other an outlet component, and said inlet an outlet components being transversly spaced and biased toward sealing slidable engagement with the respectively adjacent wall surfaces of said cylinder.

3. The valve assembly of claim 2 in which said inlet and outlet ports are respectively provided by said inlet and outlet components, and said pressurizable chamber is in substantially continuous flow communication with said inlet passage.

4. The valve assembly of claim 1 in which said cylinder is provided with two transversely spaced substantially planar walls disposed in generally facing parallelism and respectively having said inlet and outlet passages opening therethrough into said cylinder, said valve structure being provided along opposite sides thereof with substantially planar walls slidingly engaging the planar walls of said cylinder.

5. The valve assembly of claim 4 in which said valve structure comprises a plurality of individual components one of which is an inlet component and the other an outlet component, said inlet and outlet components being transversely spaced and biased toward sealing slidable engagement with the respectively associated planar walls of said cylinder, and said pressurizable chamber being in substantially continuous flow communication with said inlet passage.

6. The valve assembly of claim 5 in which said valve structure further includes a seal component interposed between said inlet and outlet components, and said inlet and outlet ports being respectively provided by said inlet and outlet components.

7. The valve assembly of claim 1 in which said casing is provided with a main body part having a pair of axially extending walls spaced apart transversely and providing facing generally planar surfaces comprising wall segments of the aforesaid cylinder, said inlet and outlet passages being respectively associated with said spaced apart walls and communicating with said cylinder therethrough, in which said valve structure is provided along opposite sides thereof with substantially planar walls slidably engaging the planar surfaces of said cylinder, and in which said casing further comprises a cap enclosing said axially extending walls and together with the planar surfaces thereof defining the axially extending boundaries of said cylinder.

8. The valve assembly of claim 7 in which said valve structure comprises a plurality of individual components one of which is an inlet component and the other an outlet component, said inlet and outlet components being transversely spaced and biased toward sealing slidable engagement with the respectively associated planar surfaces of said cylinder, and said pressurizable chamber being in substantially continuous flow communication with said inlet passage.

9. The valve assembly of claim 8 in which said valve structure further includes a seal component interposed between said inlet and outlet components, said inlet and outlet ports being respectively provided by said inlet and outlet components.

10. The valve assembly of claim 9 in which said cap is provided with a central opening and said piston is provided with an axial projection extending through said opening so as to have a manual force applied thereto, the cylinder space intermediate the bottom closure of said cylinder and said piston being vented to atmosphere.